US009132302B2

(12) United States Patent
Luongo et al.

(10) Patent No.: US 9,132,302 B2
(45) Date of Patent: Sep. 15, 2015

(54) DEVICE AND METHOD FOR COOKTOP FIRE MITIGATION

(71) Applicants: Wade Luongo, Saugus, MA (US); Karen Benedek, Winchester, MA (US); Philip C. Carbone, North Reading, MA (US)

(72) Inventors: Wade Luongo, Saugus, MA (US); Karen Benedek, Winchester, MA (US); Philip C. Carbone, North Reading, MA (US)

(73) Assignee: Primaira, LLC, Woburn, MA (US)

( * ) Notice: Subject to any disclaimer, the term of this patent is extended or adjusted under 35 U.S.C. 154(b) by 138 days.

(21) Appl. No.: 13/840,280

(22) Filed: Mar. 15, 2013

(65) Prior Publication Data

US 2014/0048293 A1 Feb. 20, 2014

Related U.S. Application Data

(60) Provisional application No. 61/683,097, filed on Aug. 14, 2012.

(51) Int. Cl.

| | |
|---|---|
| ***F24H 1/18*** | (2006.01) |
| ***A47J 27/00*** | (2006.01) |
| ***A62C 3/00*** | (2006.01) |
| ***A47J 27/62*** | (2006.01) |

(52) U.S. Cl.
CPC . *A62C 3/006* (2013.01); *A47J 27/62* (2013.01)

(58) Field of Classification Search
None
See application file for complete search history.

(56) References Cited

U.S. PATENT DOCUMENTS

| | | | | | |
|---|---|---|---|---|---|
| 2,399,423 | A | * | 4/1946 | Bletz | 219/448.16 |
| 2,764,661 | A | * | 9/1956 | Molyneaux | 219/494 |
| 2,781,038 | A | * | 2/1957 | Sherman | 126/52 |
| 2,806,122 | A | * | 9/1957 | Thunander | 219/448.14 |
| 4,146,865 | A | * | 3/1979 | Scharbach et al. | 338/28 |
| 4,237,368 | A | * | 12/1980 | Welch | 219/448.17 |
| 4,399,351 | A | * | 8/1983 | Koff | 219/433 |
| 4,410,793 | A | * | 10/1983 | Fischer et al. | 219/448.15 |
| 4,710,611 | A | * | 12/1987 | Axelson | 219/448.14 |
| 4,740,664 | A | * | 4/1988 | Payne et al. | 219/448.12 |
| 4,812,624 | A | * | 3/1989 | Kern | 219/448.14 |
| 4,812,625 | A | | 3/1989 | Ceste, Sr. | |
| 5,176,451 | A | * | 1/1993 | Sasada et al. | 374/179 |
| 5,796,346 | A | | 8/1998 | Wash et al. | |
| 5,961,867 | A | | 10/1999 | McWilliams | |
| 6,663,009 | B1 | | 12/2003 | Bedetti et al. | |

(Continued)

FOREIGN PATENT DOCUMENTS

| | | |
|---|---|---|
| JP | 6-129645 | 5/1994 |
| WO | WO 2009/011994 | 1/2009 |

OTHER PUBLICATIONS

David Miller, Risana Chowdhury; "2006-2008 Residential Fire Loss Estimates"; Jul. 2011; U.S. Consumer Safety Commission; Bethesda MD.

(Continued)

*Primary Examiner* — Thor Campbell
(74) *Attorney, Agent, or Firm* — Pauley Erickson & Kottis

(57) ABSTRACT

A device for limiting the temperature of cookware on a cooktop to a threshold level that corresponds to an oil ignition temperature. The device includes a temperature sensor that is positioned adjacent a bottom of the cookware on the cooktop. A control device in combination with each of the temperature sensor and the cooktop monitors the temperature and adjusts a heating element of the cooktop as needed to avoid cooking oil ignition. The temperature sensor can be a spring loaded temperature sensor to ensure and/or absorb contact with the cookware.

18 Claims, 13 Drawing Sheets

(56) References Cited

U.S. PATENT DOCUMENTS

| | | | | |
|---|---|---|---|---|
| 7,307,246 | B2 * | 12/2007 | Smolenski et al. | 219/497 |
| RE42,513 | E * | 7/2011 | Clothier | 219/620 |
| 8,001,957 | B2 | 8/2011 | Clauss et al. | |
| 2002/0175213 | A1 * | 11/2002 | Wodeslavsky | 236/20 A |
| 2004/0164067 | A1 * | 8/2004 | Badami et al. | 219/494 |
| 2005/0089809 | A9 | 4/2005 | Repper et al. | |
| 2007/0170169 | A1 | 7/2007 | Jeong | |

OTHER PUBLICATIONS

Ronald L. Medford et al.; "Memorandum"; Jun. 25, 2001; U.S. Consumer Product Safety Commission; Washington, D.C.; prepared by Arthur D. Little, Inc.

"Technical Feasibility Goals, Document No. 858-04-01"; Underwriters Laboratory; Jan. 2004.

David A. Dint et al.; "Report of Research on Cooktoop Pan Contact Temperature Sensor-Technical Feasability Performance Goals", Underwriters Laboratories, Inc., Northbrook, IL; Aug. 12, 2004.

* cited by examiner

Pan Bottom Temperatures for Functions and Ignition

| Condition Statement | Element Power |
|---|---|
| Sensor Temp < 515°F | ON |
| Sensor Temp ≥535°F AND Sensor Δ≥ 2.0 | OFF |
| Sensor Temp < 575°F AND Sensor Δ< 2.0 | ON |
| Sensor Temp ≥ 590°F | OFF |

FIG. 6

| Condition Statement | Burner Flame |
| --- | --- |
| Sensor Temp < 515°F | Full |
| Sensor Temp ≥ 550°F AND Sensor Δ ≥ 1.0 | Reduced |
| Sensor Temp < 550°F AND Sensor Δ < 1.0 | Full |
| Sensor Temp ≥ 585°F | Reduced |

FIG. 9

DEVICE AND METHOD FOR COOKTOP FIRE MITIGATION

CROSS REFERENCE TO RELATED APPLICATION

This Patent Application claims the benefit of U.S. Provisional Application, Ser. No. 61/683,097, filed on 14 Aug. 2012. The co-pending Provisional Patent Application is hereby incorporated by reference herein in its entirety and is made a part hereof, including but not limited to those portions which specifically appear hereinafter.

BACKGROUND OF THE INVENTION

Residential cooking fires remain a significant source of property damage and injury. According to Consumer Product Safety Commission (CPSC) staff estimates, all cooking equipment-related fires account for nearly 40% of all residential fires that were attended to by a fire department while range/oven, non-confined fires account for approximately 14,600 incidents per year (D. Miller and R. Chowdhury; 2006-2008 Residential Fire Loss Estimates; U.S. Consumer Product Safety Commission, 2011). Government funded research has demonstrated that food and pan-bottom temperatures are reliable indicators of pending ignition.

One approach to mitigate cooking fires is based on the history of testing and analysis that shows that limiting the pan temperature to roughly 700° F. or below will avoid temperatures at which the preponderance of fires from ignition of food in a cooking vessel will occur.

The challenge has been to limit the pan temperature at or below approximately 700° F. while ensuring that the heating rate remains high enough that heat times, boil times, and high temperature cooking methods are not compromised. An acceptable implementation of the temperature limit should not compromise cooking modes including: boiling, searing, sautéing, frying, blackening, or simmering.

U.S. Pat. No. 5,796,346 to Walsh describes a stove including circuitry to facilitate avoidance of fires such as may be caused by grease or another flammable substance present on the stove burner. The control shuts the element off when a time limit is reached while operating at power level above a predetermined threshold that could lead to the pan reaching an ignition temperature of grease. Time is not a sufficient indicator of fire risk as the time to reach the ignition temperature can vary with element power, pan size and type, oil amount, etc.

U.S. Pat. No. 8,001,957 to Clauss describes the opposite of this approach, in which the gas burner operates at a maximum level except for a limited period of time over which a booster can be used to temporarily allow an increase in gas flow rate and therefore burner power. The basic gas cooking hob is enhanced with a timing member which allows the heating power to be increased beyond the nominal power during a certain interval. Fire is mitigated by preventing a high power level for an extended period of time. This is not sufficient to catch high pan temperatures when the hob is at its standard, maximum level.

U.S. Pat. No. 4,812,625 to Ceste describes a temperature control system for cooking apparatus, for example, a fryer using cooking oil or shortening which is heated by a suitable heating element. The cooking apparatus has different modes of operation including start-up mode, idle mode and cooking mode. Overshoot to a temperature above the setpoint temperature is limited during start-up mode, idle mode and cooking mode with the apparatus having different temperature control characteristics based on the mode of operation and adapting variable parameters to achieve optimum temperature control accuracy. But in this case, the cooking medium, i.e. the cooking oil has a temperature sensor reading its temperature directly. An alternative approach is needed when the temperature of the oil cannot be read directly, as is the case when the oil is inside a pan and the pan is heated by the hob.

U.S. Pat. No. 6,663,009 to Bedetti describes a configuration of sensors around a gas flame to detect pan temperature and control heat output of the burner, but does not identify an algorithm that would be able to mitigate a safety problem from this temperature sensor input.

SUMMARY OF THE INVENTION

The present invention generally relates to the field of cooktops and ranges (defined as an integrated cooktop and oven). As used herein, the term “cooktop” refers generally to all kinds of cooking appliances that use a gas burner and/or an electric element for heating or cooking a food material, such as cooktops, ranges and cooking hobs. This invention provides a device and method for mitigating the risk of cooktop fires with the use of a cookware-temperature limiting control to prevent food ignition in a pan on the cooktop. It is another intention of this invention to provide a device and method that takes automatic corrective actions to prevent food ignition and subsequent fire. It is another intention of this invention to provide a device and method that differentiate between standard cooking practices and conditions that may lead to ignition of food in the pan, so that the automatic corrective actions do not interfere with otherwise safe cooking practices.

A standard cooktop includes a fuel or power source, such as a gas flow line or an electric line or main, in combination with a pan heating element, such as either a gas burner or an electric element. A user interface typically allows for setting a power level, and can include a knob or a digital user interface. The cooktop further includes a power regulating device, such as a valve for the gas burner, an infinite switch for an electric element or an electronically controlled relay that establishes a duty cycle based on the control setting from the user interface.

In one embodiment, the invention provides a device for limiting the temperature of a pan on a cooktop to a threshold level that corresponds to an oil ignition temperature. The device includes a temperature sensor that is adjacent to a bottom of the pan on the cooktop, and a control device in combination with each of the temperature sensor and the cooktop. The control device modifies a heating element of the cooktop in response to a signal from the temperature sensor to maintain a temperature of the bottom of the pan below a predetermined oil ignition temperature and above a cooking temperature. The temperature sensor can be a spring loaded temperature sensor, and can include or be a thermistor and/or a resistance temperature detector. In one embodiment, the temperature sensor includes a convex cover that maintains pan or cooktop contact during pan use on the cooktop.

The temperature sensor of this invention is added to the cooktop to measure the temperature at the bottom of the pan, either directly or indirectly. The sensor is in direct contact with the pan in a cooktop configuration such as a gas cooktop or an electric coil element. The sensor is positioned under a glass ceramic cooking surface in a so-called “smoothtop” cooktop where in there is no possible access through the glass ceramic to the pan bottom. In one embodiment, the invention includes a threshold temperature algorithm that can be executed in a control device including a suitable data processor and/or non-transitory memory device. The algorithm can be implemented in various known cooktop control systems, such as for each of electric coil, gas and glass ceramic electric. The algorithms used in the gas and electric coil cooktops are similar, as both systems utilize a pan-bottom-sensor that contacts the pan directly. In both systems, the control algorithm desirably uses a combination of rate of change and threshold monitoring to define when to interrupt the heating element's power or gas input. In the gas cooktop, the heat-input is desirably reduced to a set fraction of the maximum heating rate when the algorithm calls for heat reduction. With this approach, it is not necessary to reignite the flame as the control is turned on and off. It can be a significant benefit to a simplification of the control system to be able to keep the flame burning, as reignition of the flame can become a critical design consideration. In the electric coil cooktop, power to the element is shut off entirely until conditions for repowering the element are met.

The algorithm used in the glass ceramic cooktop is different from the other two types as the pan temperature is being inferred from the glass ceramic temperature (and/or the air temperature in the rough-in box below the glass ceramic). While this algorithm also considers measured temperature and rate of change of the temperature, it also incorporates a calculation of change in the slope of the temperature/time curve. This added algorithm element is necessary to compensate for the high thermal inertia of the system.

Electric Coil

With the electric coil cooktop, the pan is placed directly on top of one of multiple electric resistance elements. The heat from the element(s) is transferred into the pan by some combination of conduction, convection and radiation, depending on how well the pan contacts the element.

There is access for a pan-bottom temperature sensor according to this invention to contact the pan directly. There is some thermal inertia in the electric element. The implication of the thermal inertia of the coil is that the pan temperature can continue to rise even after the power to the element has been reduced or removed. Therefore, even with a sensor contacting the pan directly, there is a need to know both the temperature of the pan and its rate of change of temperature in order to ensure that the temperature does not exceed a preset value. When a rate of change of the pan temperature is quite low, the measured pan temperature can be allowed to approach the threshold temperature more closely, without risk of temperature overshoot.

In one embodiment of this invention, the set points of a control algorithm (the control logic) are defined and used to prevent vessel temperatures from rising above, for example, roughly 700° F. without interfering with normal cooking. The control algorithm of one embodiment of this invention uses a combination of rate of change and threshold monitoring to determine when to interrupt the element's power. This combination of threshold temperature and rate of change allows the control device to avoid overshoot of pan temperature that may occur during an initial heat-up phase of cooking, while maintaining a high enough steady state temperature threshold for excellent cooking performance.

The sensor system can desirably be configured to continuously monitor temperature. A temperature measurement is sampled by the control device from the sensor every second, or other suitable time interval. The control device also calculates the rate of change of the sensed temperature (Δ) every ten seconds, or other suitable time interval. If the sensor output voltage corresponds to a temperature that is less than 515° F., then no action is taken by the control device. When, for example, the sensor temperature is 535° F. or above, and the calculated rate of change of temperature is greater than 2° F. per second, the control device, via the control algorithm, sends a signal to a relay to turn the element off. The element will stay off until the sensor temperature is less than, for example, 575° F., and the slope is, for example, less than 2.0° F./sec. Once both of these conditions are met, the element power is turned back on. After the initial heating of the cookware, the slope tends to level off well below the 2.0° F./sec set point, and the controls will only interrupt the element power if the sensor temperature rises to or above a further thresold, for example 590° F. The element will be turned on again as the temperature of the sensor drops below 590° F.

This combination of control states balances issues of thermal inertia of the coil (and potential cookware temperature overshoot) during the heat up of the pan with the need to maintain high enough steady state operating temperatures to perform all the desired cooking functions. Extensive testing was conducted to determine desirable values of the control parameters. The slope parameter had to be high enough to distinguish a period of pan heat-up from a period of steady-state cooking. If the pan is heating quickly, the temperature threshold for shutoff needs to be low (because thermal inertia makes the pan continue to heat after the element is shut off). If the slope parameter selected is too high, the threshold temperature must be even lower to avoid overshoot. A slope of 2° F./second combined with a threshold of 535° F. was discovered be a desirable condition.

Gas Burner

With a gas cooktop, the pan is placed on a grate that is located above the gas burner. The heat from the flame is transferred into the pan primarily by convection. As is the case with the electric coil, there is access for a pan-bottom temperature sensor to contact the pan directly. There is some thermal inertia in the gas, but it is less than that of the electric coil. The rapid responsiveness of the gas burner makes it possible to reduce pan temperature by turning the flame down rather than turn it off entirely. The turndown approach significantly simplifies the process of returning the heat to the previous input rate.

In one embodiment of this invention, the control algorithm uses a combination of rate of temperature change and threshold monitoring to determine when to reduce the gas flow to the burner. The control device continuously monitors the temperature of the cookware as soon as the burner is turned on. The rate of change (Δ) of the temperature of the cookware is calculated, for example, every ten seconds.

The temperature sensor is desirably always activated. The control device is desirably, and without limitation, sampling temperature data every second and calculating a rate of change of temperature every 10 seconds. If the sensor temperature is less than, for example, 515° F., no control action is needed and there is no activation of any control valves. When the controller detects that the sensor temperature is, for example, 550° F. or above, it compares the calculated slope to the slope set point of, for example, 1.0° F./sec; if the slope is greater than 1.0° F./sec and the sensor measures the pan temperature to be 550° F. or above, the gas is restricted and the flame reduces to half (the maximum) input rate. The burner will stay at a reduced rate, such as half-rate, until the sensor detects that the cookware temperature is less than 550° F. and the slope is less than 1.0° F./sec. Once both of these condition are met, the burner's flame returns to the user's set point. After the initial heating of the cookware, the slope tends to level off well below the 1.0° F./sec set point, and the controls will only reduce the burner flame if the sensor temperature rises, for example, to or above 585° F. The burner's flame returns to the user's set point again as the temperature of the sensor drops below 585° F.

Electric Glass Ceramic (Smoothtop)

With an electric glass ceramic cooktop, the electric resistance heating elements are located under a sealed, ceramic surface. The electric element radiates heat to and through the glass ceramic surface. The element also convects heat to the glass ceramic surface. Heat is subsequently radiated, conducted and convected from the top of the glass ceramic surface to the bottom of the pan. In all cases, the temperature under the glass ceramic is often significantly higher than the temperature of the cooking utensil (pot or pan).

There is no access for a sensor to contact a pan directly without disturbing the smooth and sealed cooktop surface. Therefore, the temperature sensor is positioned under the glass ceramic surface. In this configuration, the environment around the temperature sensor is much hotter than the pan itself There is also significant thermal inertia in the combination of the heating element and the glass ceramic cooktop surface. The pan-temperature limiting control algorithm, therefore, infers pan temperature, rather than measuring it directly.

In one embodiment of this invention, the temperature sensor in the glass ceramic cooktop is positioned below the glass ceramic so that there is nothing visible on the exterior cooktop surface. The temperature sensor is located in the center of the element and is held against the ceramic with a spring force (that is similar to how the element itself is pressed against the glass ceramic).

In one embodiment, the control algorithm uses a combination of rate of change and threshold monitoring to decide when to remove power to the element. The control device continuously monitors the glass ceramic temperature. The rate of change (Δ) of the measured temperature is calculated, for example, every 10 seconds. The duty cycle of the heating element is established based on specific combinations of measured temperature and change in temperature, such as defined in FIG. 13. In the exemplary embodiment of FIG. 13, if the measured temperature exceeds 440° F. and the rate of change of temperature is greater than 1.65° F. per second, then the duty cycle of the element is limited to 18 seconds on, 12 seconds off. This same duty cycle is also imposed if the measured temperature is between, for example, 550 and 572° F., but the rate of change of temperature is only 0.9 ° F. per second.

The control device maintains the duty cycle at this defined level (called "Duty 1") unless the temperature remains over 500° F., then the duty cycle is reduced to "Duty 2", which is 12 seconds on and 18 seconds off. Finally, if the measured temperature is falling, but the measured temperature is below, for example, 730° F., the element is pulsed "on" for 10 seconds, or other suitable time, to prevent the pan from falling to excessively low temperatures that will not effectively cook the food.

BRIEF DESCRIPTION OF THE DRAWINGS

FIG. 6 is a table of electric coil algorithm set points according to one embodiment of this invention.

FIG. 9 is a table of gas burner algorithm set points according to one embodiment of this invention.

DETAILED DESCRIPTION OF THE INVENTION

Figure 1:
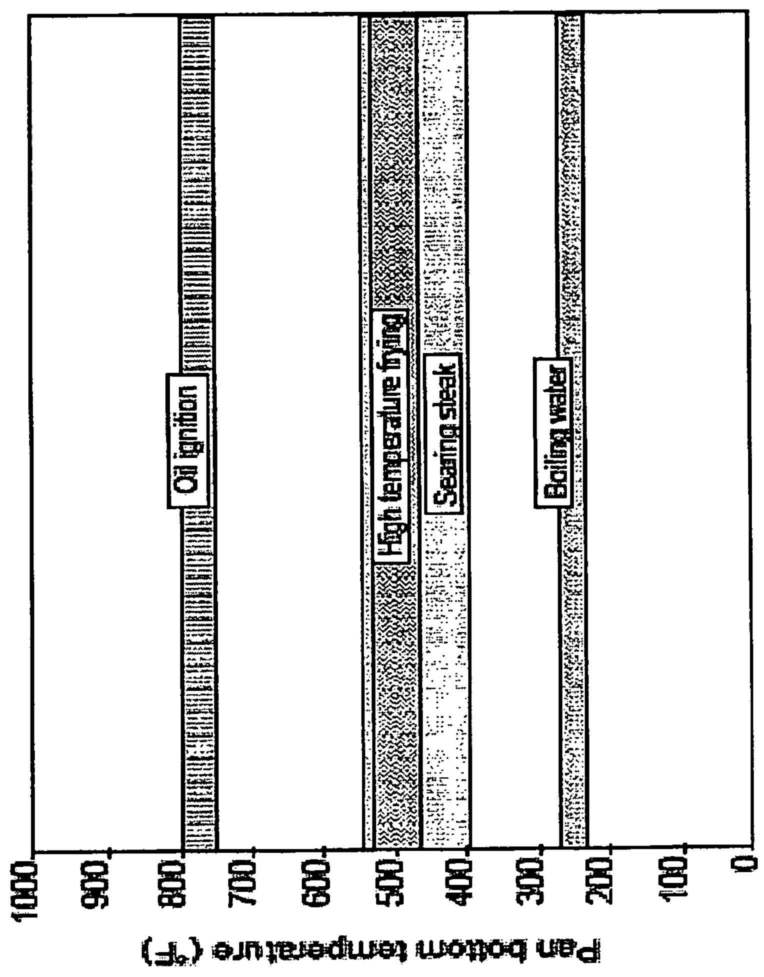
FIG. 1 illustrates exemplary pan bottom temperatures for particular functions and ignition.

The present invention provides a temperature-dependent cooktop safety device and method for various cooktops, such as including a gas burner or electric element for heating food material in a cookware container, referred to generally herein as a "pan." FIG. 1 illustrates approximate pan bottom temperatures of various cooking functions, along with an approximate temperature threshold above which oil in the pan could ignite. The invention includes a temperature detection means for detecting or inferring the temperature of the bottom face of the pan and automatically reducing the pan temperature to avoid the ignition situation. The invention includes a control device, or controller for short, that monitors a temperature sensor, and includes a heat control circuit for controlling the amount of heat issued from the electric heating element or gas burner, based upon an algorithm that defines the on/off state based upon characteristics of the detected temperature.

Figure 2:
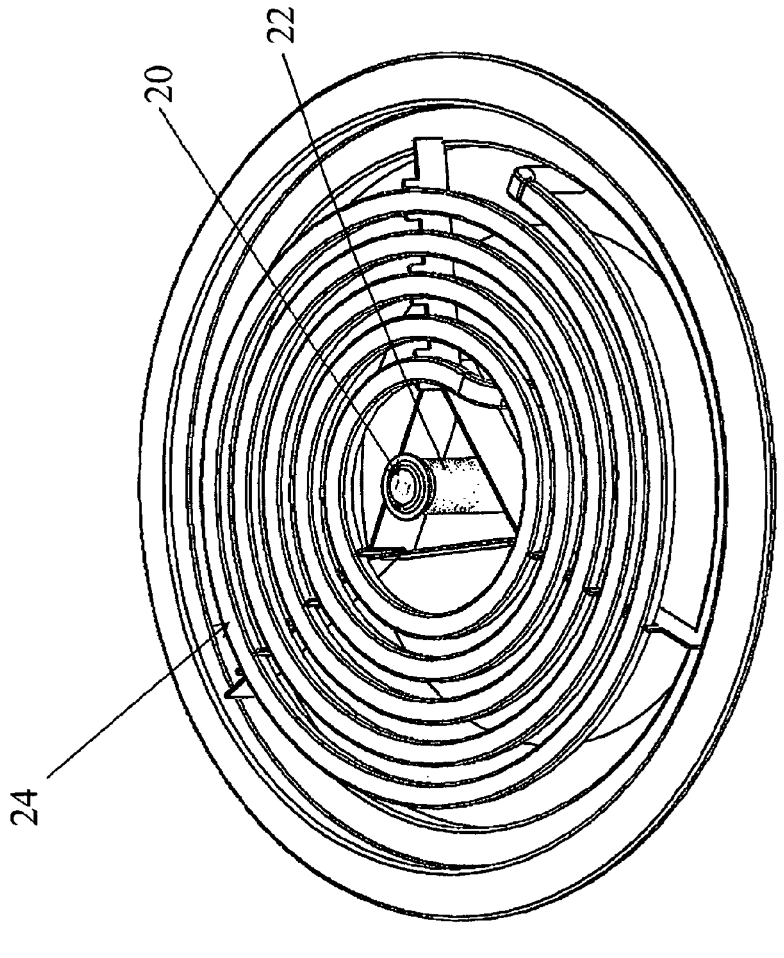
FIG. 2 illustrates a temperature sensor according to one embodiment of this invention, with an electric coil heating element.
Figure 3:
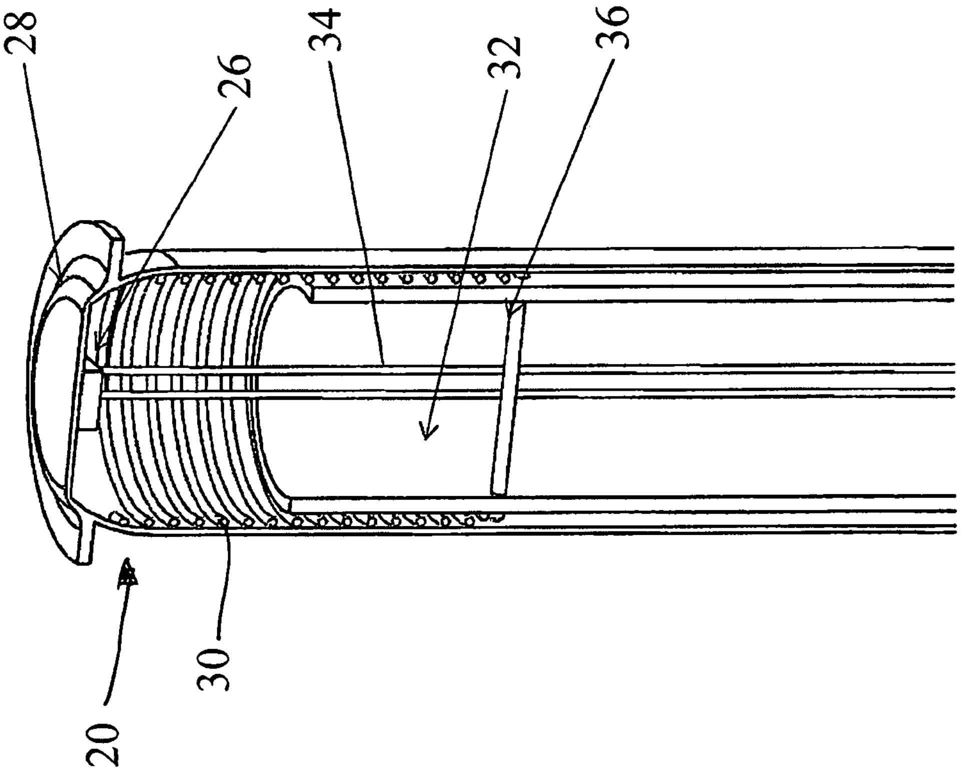
FIG. 3 illustrates a temperature sensor according to one embodiment of this invention.
Figure 4:
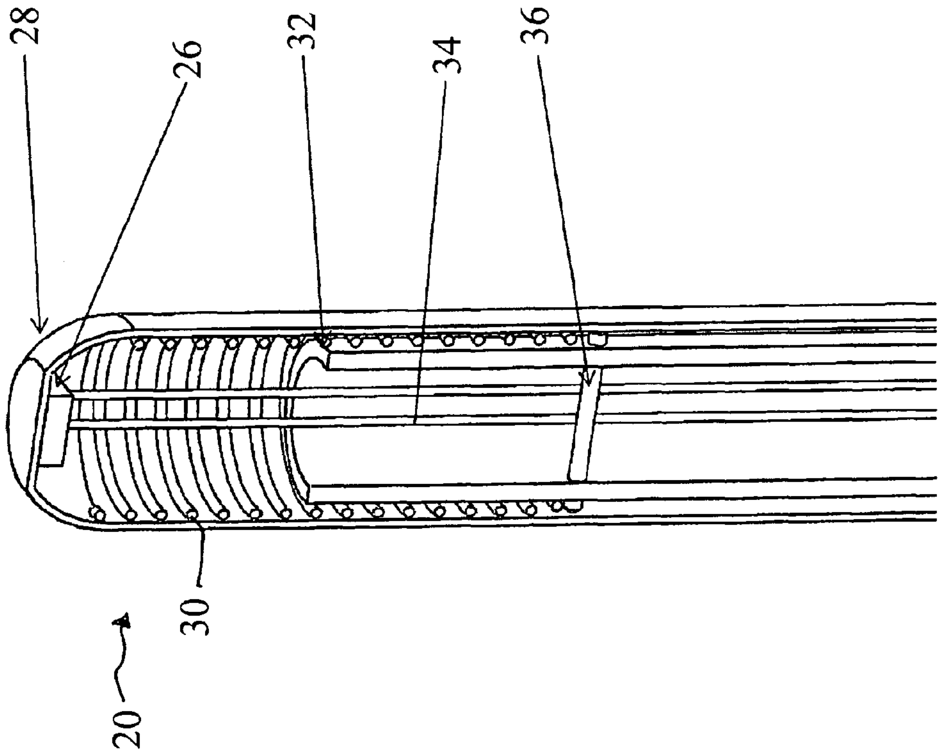
FIG. 4 illustrates a temperature sensor according to one embodiment of this invention.

FIG. 2 shows a pan-bottom temperature sensor 20 according to one embodiment of this invention, enclosed in a metal housing 22 and located in the center of an electric coil element 24. In the embodiment of FIG. 2, the temperature sensor is spring loaded to ensure direct contact with the cookware. FIG. 3 shows a detail of the spring loaded temperature sensor 20. Inside the assembly is a temperature sensor element 26, such as a thin film resistance temperature detector (RTD) or a thermistor. This sensor element 26 can be configured with a thicker or thinner diameter based on the desired stability of the spring loaded sensor. The sensor 26 is disposed on an underside of a concave cover 28. A spring element 30 is disposed beneath concave cover 28 and on an outer surface of inner shaft 32. Wires 34 connect the sensor 26 to the control device, and a support pin 36 can be used to mount the spring 30 and/or to strengthen shaft 32. The spring constant of the spring loaded temperature sensor assembly 20 is defined to allow a small pan to cause its deflection without being too light that it is damaged by pan contact. FIG. 4 shows a version of the sensor assembly 20 with a smaller diameter concave cover 28 than the version shown in FIG. 3.

Figure 5A:
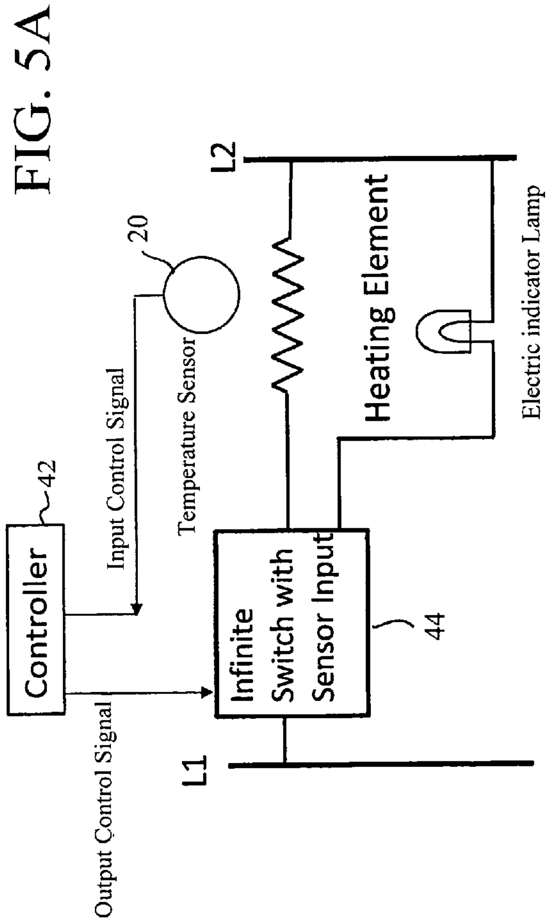
FIGS. 5A and 5B schematically illustrate electric coil cooktop controls according to embodiments of this invention.
Figure 5B:
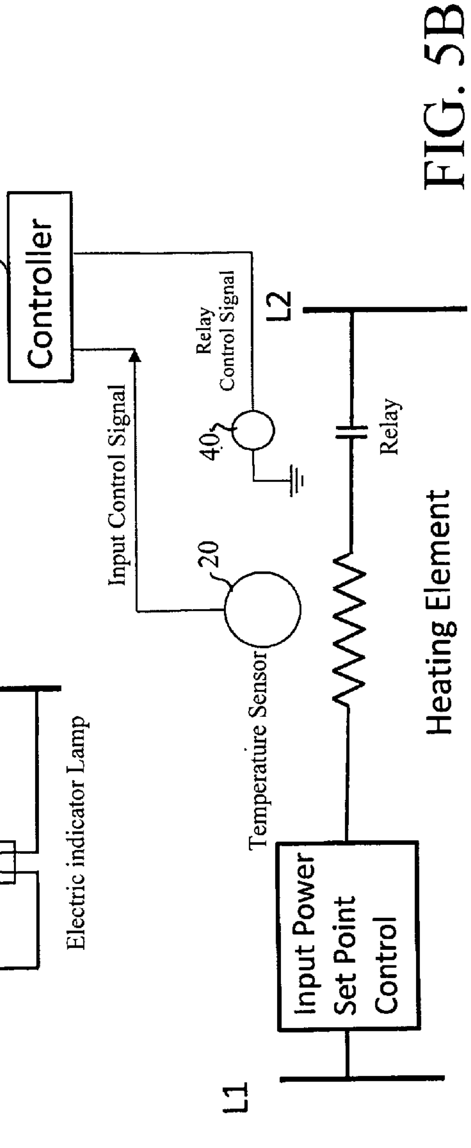

As shown in FIG. 5B, a mechanical relay 40 can be controlled by the sensor output through a control device 42. Alternatively, an electronic infinite switch 44 may be modified to accept a temperature input and control the cycling of the element directly. It is possible to use a variety of controllers, such as one including a microprocessor chip to implement the control.

FIG. 6 defines the set points of a control algorithm (the control logic) used in one exemplary embodiment of the invention to prevent vessel temperatures from rising above 700° F. without interfering with normal cooking. The control algorithm uses a combination of rate of change and threshold monitoring to determine when to interrupt the element's power.

Figure 7:
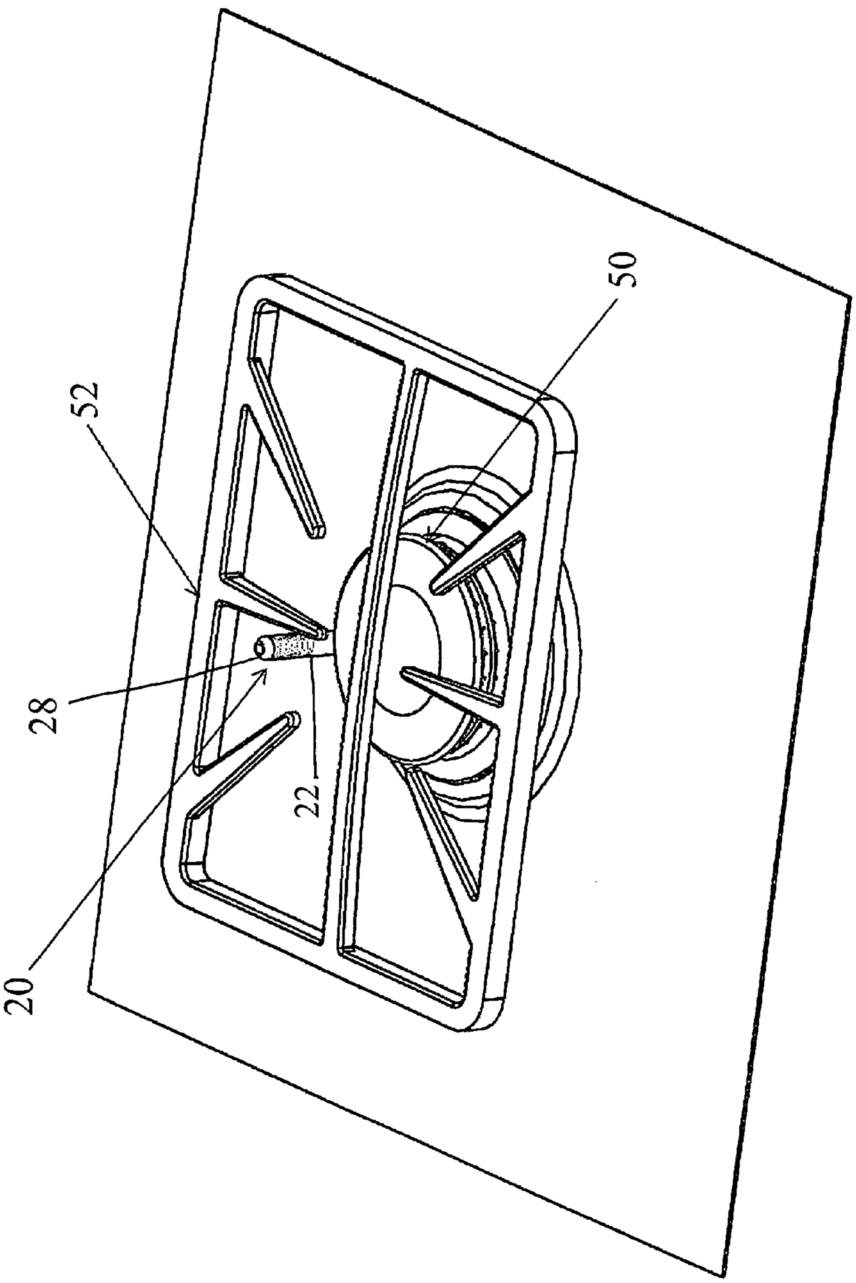
FIG. 7 illustrates a temperature sensor according to one embodiment of this invention, with a gas burner.

FIG. 7 illustrates a gas burner 50 with an integrated pan bottom temperature sensor 20. The pan-bottom temperature sensor 20 may include a thermistor or a thin film RTD sensor enclosed in a metal housing 22. The sensor is spring loaded to ensure direct contact with the cookware. The sensor 20 is positioned adjacent with the cover 28 above the grate 52, off to the side of the burner 50 so that the burner requires no modification.

Figure 8:
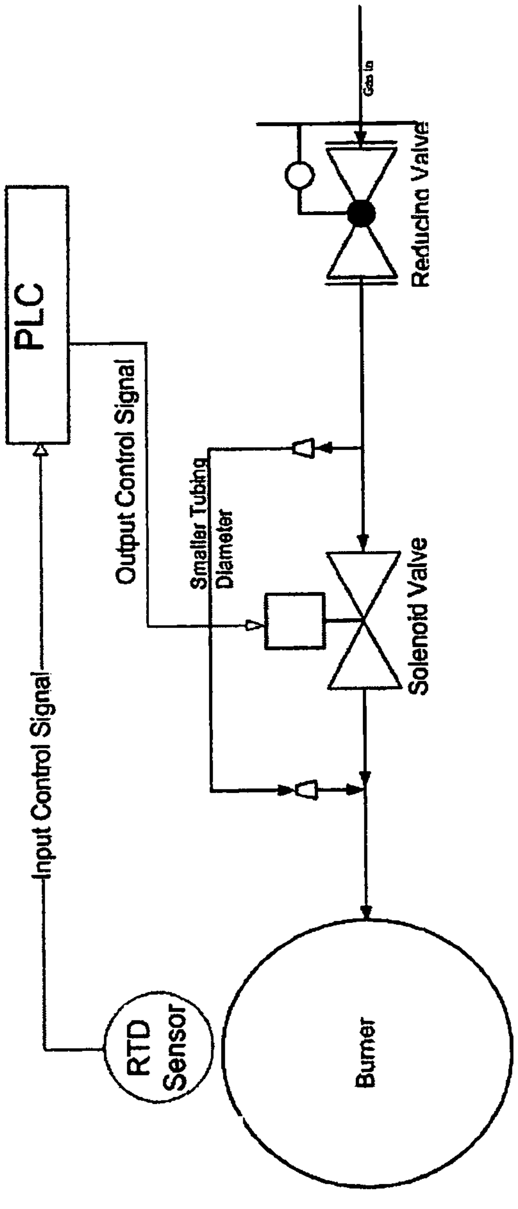
FIG. 8 schematically illustrates a gas burner cooktop control according to one embodiment of this invention.

FIG. 8 illustrates a method of controlling gas flow in the gas cooktop. Gas flow is restricted by energizing a solenoid valve that diverts the gas through a smaller diameter tube reducing the burner output to, for example, half (maximum) power. The reduced input rate is desirably always the same, and is not dependent on the input rate at the point that the control reduces the gas flow rate. This approach to burner control ensures that the heat rate is never low enough that there is a risk that it extinguishes or needs to be relit.

FIG. 9 illustrates an exemplary control algorithm for the gas fired cooktop. This algorithm uses a combination of rate of change and threshold monitoring to determine when to reduce the gas flow to the burner. The controls continuously monitor the temperature of the cookware as soon as the burner is turned on. The rate of change ($\Delta$) of the temperature of the cookware is desirably calculated every ten seconds.

Figure 10:
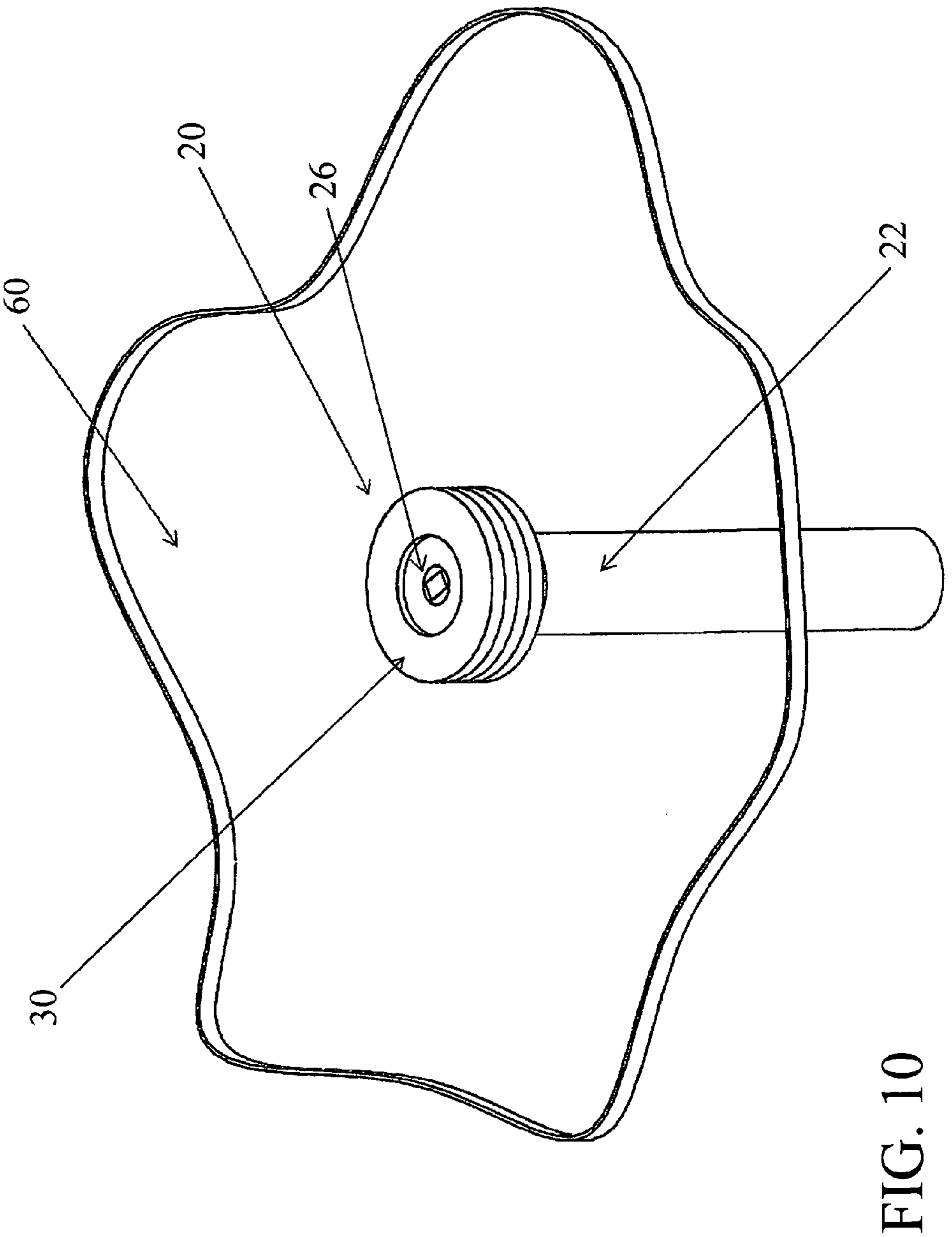
FIG. 10 illustrates a temperature sensor according to one embodiment of this invention, with a glass ceramic smoothtop burner.
Figure 11:
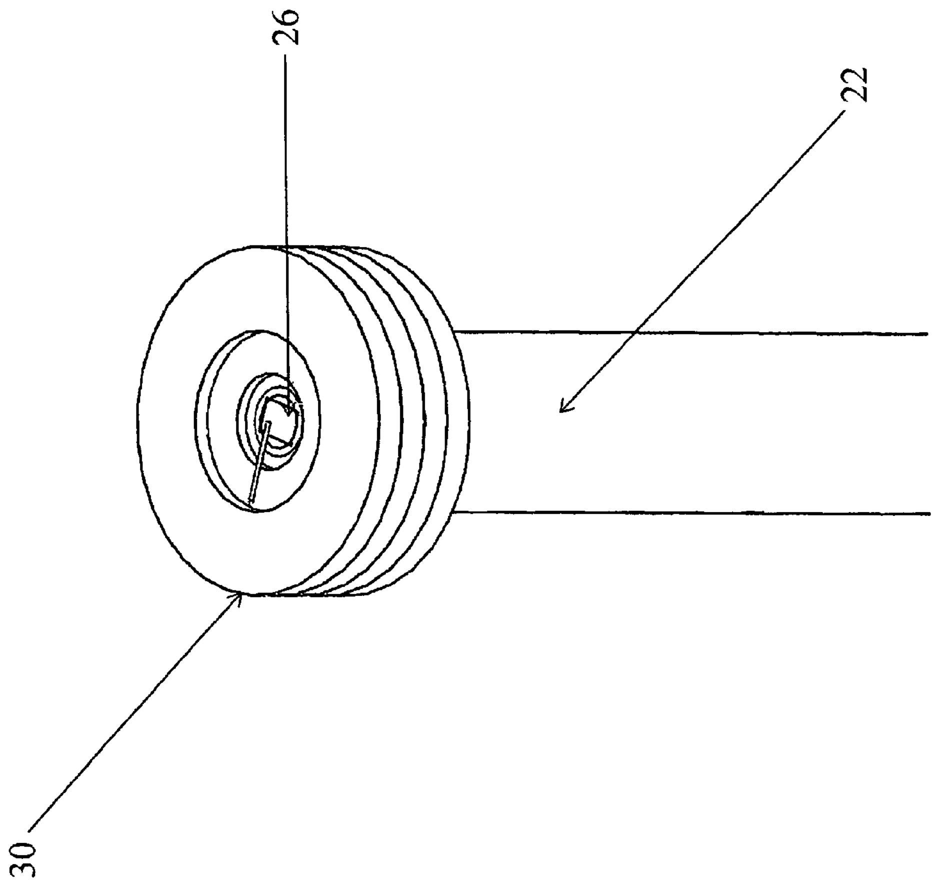
FIG. 11 illustrates a temperature sensor according to one embodiment of this invention.

FIG. 10 illustrates the position of the temperature sensor 20 under the smoothtop cooktop. FIG. 11 illustrates the details of the temperature sensor used. A sensor element 26, such as a thin film RTD sensor element is positioned in the center of the sensor and mounted on a support housing 22. The temperature sensor 20 includes an insulating spring element 30 in contact with the glass ceramic surface 60. Material such as high temperature fiber insulation is used as a spring material that facilitates the sealed contact between the temperature sensor 20 and the underside of the glass ceramic surface 60.

Figure 12:
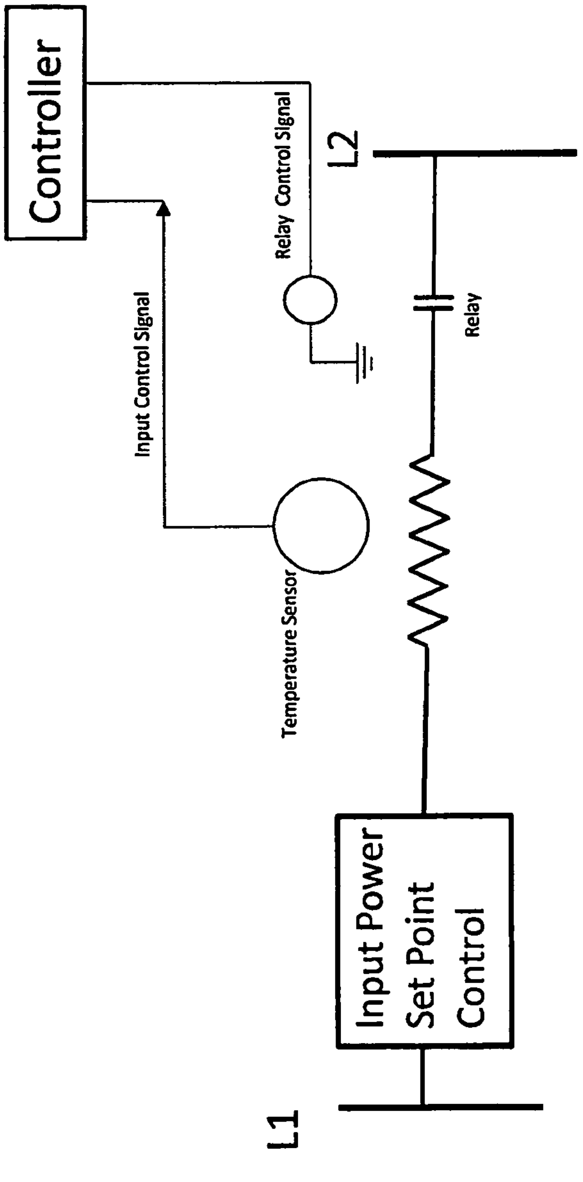
FIG. 12 schematically illustrates a glass ceramic cooktop control according to one embodiment of this invention.
Figure 13:
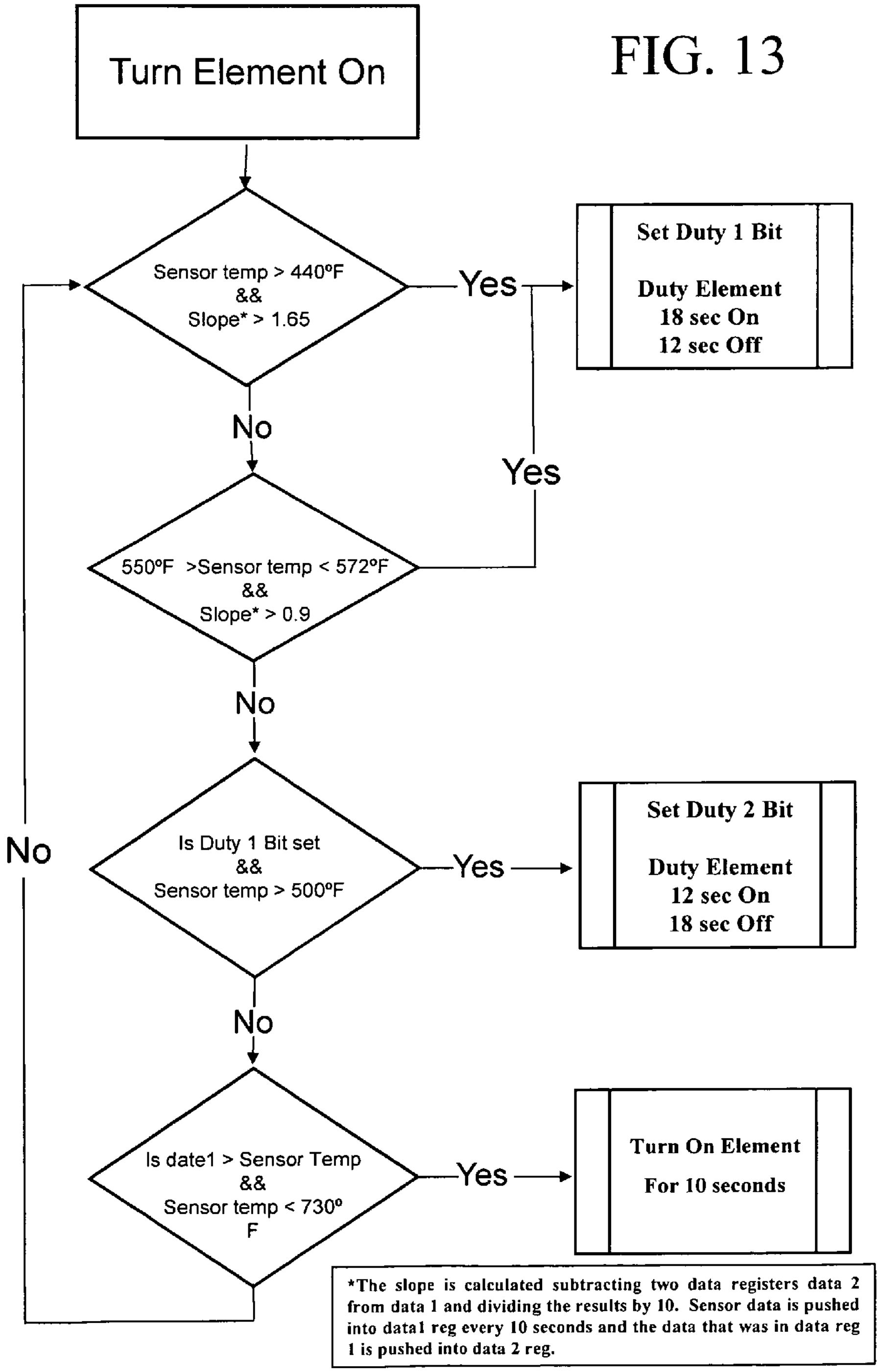
FIG. 13 illustrates a glass ceramic cooktop algorithm according to one embodiment of this invention.

FIG. 12 illustrates the elements in a control system for limiting pan temperature in a glass ceramic cooktop. FIG. 13 defines a control algorithm for the glass ceramic cooktop application. The algorithm uses a combination of rate of change and threshold monitoring to decide when to remove power to the element. The controls continuously monitor the glass ceramic temperature. The rate of change ($\Delta$) of the measured temperature is desirably calculated every 10 seconds.

Thus, the invention provides a device and method for mitigating the risk of cooktop fires with the use of a cookware-temperature limiting control to prevent food ignition in the cookware on the cooktop. The invention illustratively disclosed herein suitably may be practiced in the absence of any element, part, step, component, or ingredient which is not specifically disclosed herein.

While in the foregoing detailed description this invention has been described in relation to certain preferred embodiments thereof, and many details have been set forth for purposes of illustration, it will be apparent to those skilled in the art that the invention is susceptible to additional embodiments and that certain of the details described herein can be varied considerably without departing from the basic principles of the invention.

What is claimed is:

1. A device for avoiding an overshoot of a temperature inside a cookware on a cooktop by limiting a bottom temperature of the cookware, the device comprising:

a temperature sensing clement measuring a surface temperature adjacent a bottom of the cookware on the cooktop; and a control device in combination with each of the temperature sensing element and the cooktop, the control device having a control algorithm modifying a power level of the cooktop as a function of both a sensed temperature adjacent the bottom of the cookware and a rate of change of the sensed temperature by reducing the power level at a lower temperature when the rate of change of the sensed temperature is greater than or equal to a threshold value than when the rate of change of the sensed temperature is less than the threshold value, and the control algorithm controlling the power level as a function of the sensed temperature, the rate of change of the sensed temperature, and a change in a slope of a temperature/time curve and increasing the power level when the slope of the temperature/time curve is negative.

2. A device in accordance with claim 1, wherein the temperature sensing element comprises a spring loaded sensor.

3. A device in accordance with claim 1, wherein the temperature sensing element comprises a thermistor or a resistance temperature detector.

4. A device in accordance with claim 1, wherein the temperature sensing element comprises a convex cover that maintains contact with the cookware on the cooktop.

5. A device in accordance with claim 1, wherein during use of the cookware the algorithm prevents the temperature of the cookware from exceeding an oil ignition temperature.

6. A device in accordance with claim 1, wherein the cooktop is an electric coil cooktop including a source of electric power and an electric resistance heating element that has thermal inertia such that the temperature of the cookware can continue to rise even after power to the element has been reduced or removed, the temperature sensing element is in direct contact with the bottom of the cookware, and the control device is in controlling combination with an electric relay of the source of electric power to reduce the power in order that the bottom temperature remains below an oil ignition temperature and above temperatures required for standard cooking techniques.

7. A device in accordance with claim 1, wherein the cooktop is an electric coil cooktop including a source of electric power and an electric resistance heating element that has thermal inertia such that the temperature of the cookware can continue to rise even after power to the element has been reduced or removed, the temperature sensing element is in direct contact with the bottom of the cookware, and the control device is in controlling combination with an electric infinite switch of the cooktop to reduce the power in order that the bottom temperature remains below an oil ignition temperature and above temperatures required for standard cooking techniques.

8. A device in accordance with claim 1, wherein the cooktop is a gas fired cooktop including a source of gaseous fuel, a gas-fired burner, and a gas flow line containing a gas flow of the gaseous fuel to the gas-fired burner, the temperature sensing element is in direct contact with the bottom of the cookware, and the control device is in controlling combination with the gas flow line to reduce the gas flow in order that the bottom temperature remains below an oil ignition temperature and above temperatures required for standard cooking techniques.

9. A device in accordance with claim 8, wherein the control device lowers the gas flow to a set input rate that does not turn a cooktop flame off entirely when controlling the cookware temperature to a threshold level to avoid oil ignition.

10. A device in accordance with claim 8, wherein the control device is in controlling combination with a valve of the gas flow line.

11. A device in accordance with claim 10, wherein the valve directs the gas flow to a bypass line with a defined diameter.

12. A device in accordance with claim 1, wherein the cooktop is a smoothtop electric cooktop including a source of power, a glass ceramic cooktop surface with thermal inertia such that the temperature of the cookware can continue to rise even after power to the element has been reduced or removed, and an electric heat source below the cooktop surface, the temperature sensing clement is mounted to an under surface of the glass ceramic cooktop surface, and the control device controls power to the electric heat source in order that the bottom temperature remains below an oil ignition temperature and above temperatures required for standard cooking techniques.

13. A device in accordance with claim 12, wherein during use of the cookware the algorithm prevents the temperature of the cookware from exceeding the oil ignition temperature.

14. A device in accordance with claim 1, wherein the power level of the heating element is shut off completely, reduced from a starting power level or set to a defined duty cycle.

15. A device in accordance with Claim 1, wherein the control algorithm increases the power level when a slope of a temperature/time curve is negative even if the sensed temperature is above a second threshold value.

16. A device in accordance with Claim 1, wherein the increase in the power level is for a defined interval.

17. A device in accordance with claim 1, wherein the surface temperature is of a protective cover of a temperature sensor or is a glass ceramic cooktop.

18. A device in accordance with claim 1, wherein the power level is of a power source that is an electric coil, an electric radiant element, or a gas-fired burner.

* * * * *